United States Patent [19]

Fagrell

[11] 4,412,686

[45] Nov. 1, 1983

[54] FOLDING STEP FOR VEHICLES

[75] Inventor: Erik T. Fagrell, Västra Frölunda, Sweden

[73] Assignee: AB Volvo, Gothenburg, Sweden

[21] Appl. No.: 277,202

[22] Filed: Jun. 23, 1981

[30] Foreign Application Priority Data

Jun. 23, 1980 [SE] Sweden ............................ 8004619

[51] Int. Cl.³ .............................................. B60R 3/02
[52] U.S. Cl. ................................... 280/166; 105/447; 182/91
[58] Field of Search ................ 105/341, 343, 447; 182/91; 280/161, 164 R, 166

[56] References Cited

U.S. PATENT DOCUMENTS

| 1,182,563 | 5/1916 | Hild et al. | 280/166 |
| 1,523,311 | 1/1935 | Swayze et al. | 105/447 |
| 2,409,418 | 10/1946 | Carmichael | 280/166 |

FOREIGN PATENT DOCUMENTS

| 1032052 | 6/1953 | France | 280/166 |
| 520281 | 8/1976 | U.S.S.R. | 280/166 |

Primary Examiner—Joseph F. Peters, Jr.
Assistant Examiner—Pierre Huggins
Attorney, Agent, or Firm—Young & Thompson

[57] ABSTRACT

A folding step beneath a vehicle door has a folding mechanism comprising a shaft joined to the door and extending downwards along the extended hinge line. The shaft has a driver interacting with abutments on the step to initiate folding out and folding up of the step. The step is loaded by a snap spring mechanism which, after initial folding out with the aid of the driver, completes the folding out of the footstep so that folding out is accomplished regardless of whether the door is opened completely or partially.

5 Claims, 3 Drawing Figures

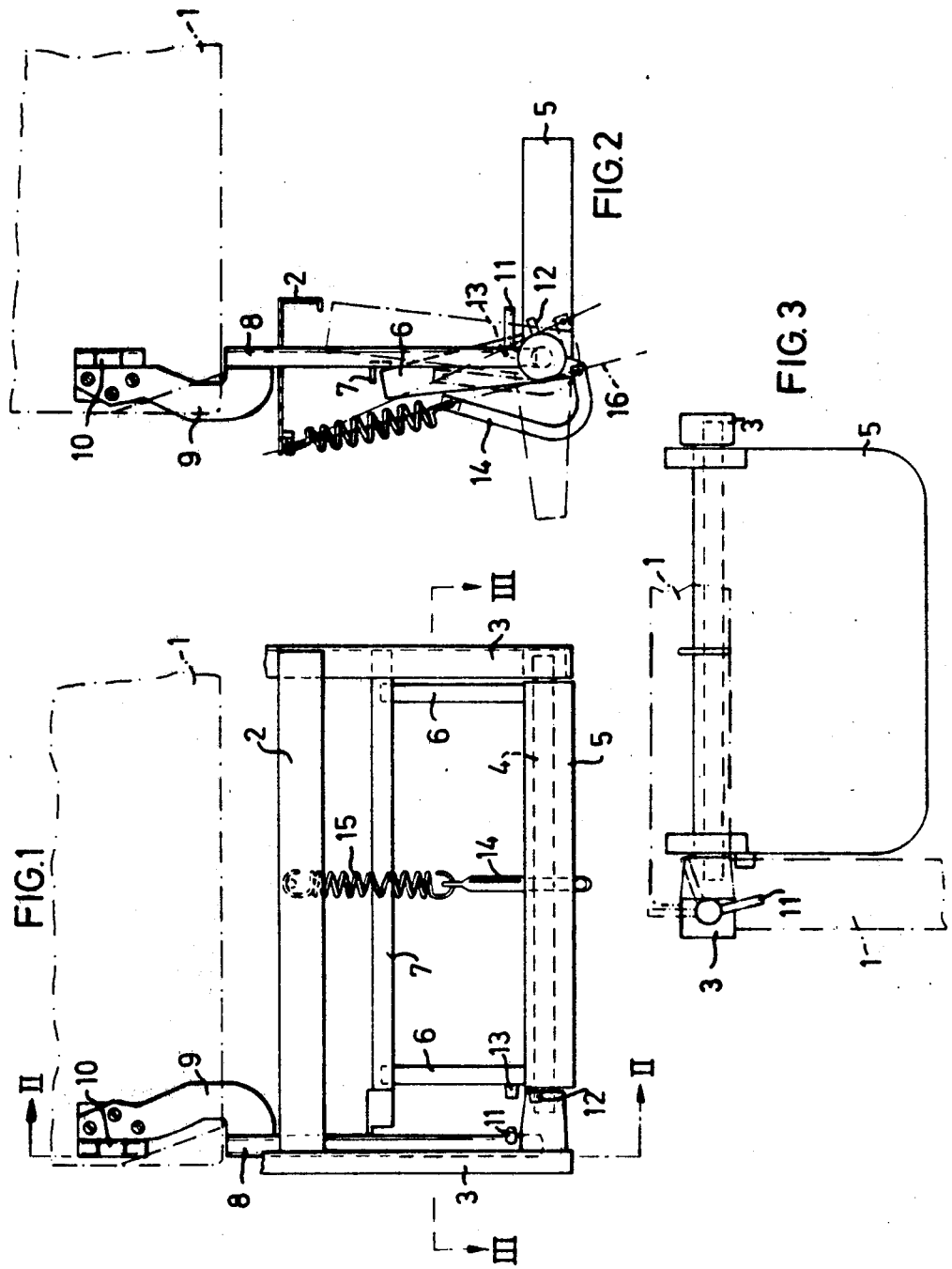

FOLDING STEP FOR VEHICLES

The present invention relates to a folding step for vehicles, comprising a plate arranged beneath a vehicle door, said plate being mounted in the vehicle for swinging between an essentially vertical upwardly directed position and a horizontal outwardly directed position, and a mechanism acting between the door and the plate, said mechanism being arranged upon opening and closing of the door to swing the plate between said positions, said mechanism having a shaft member joined to the door, extending downwards from the door in the extension of the door hinge line and interacting with means which, upon rotation of the shaft member, cause the plate to swing.

Folding steps are used inter alia in vehicles which are gotten into and out of quite frequently, for example garbage trucks and distribution vehicles. A folding step can be folded down outside the permissible vehicle width, thus providing a less steep stair angle and more comfortable entry.

Most known folding steps are equipped with some form of arrangement interacting with the door which mechanically achieves folding out and folding up upon opening and closing of the door. For example, U.S. Pat. No. 1,523,311 reveals as previously known a folding step of the type described above, in which the movement of the shaft member joined to the door is transmitted to the step via a mitre-wheel gear. An essential disadvantage of this design is that the movement of the step is synchronized with the opening movement of the door, which means that the door must be opened completely in order for the step to be used. When the space beside the vehicle does not permit the door to be opened completely, the step cannot be used since it cannot be folded out completely.

The purpose of the present invention is to achieve a folding step of the type described by way of introduction, which has a simple mechanism permitting complete folding out even after a short initial opening movement of the door.

This is achieved according to the invention by said means comprising a driver joined to the shaft member, said driver being arranged, upon rotation of the shaft member, to be brought into contact with abutments on the plate to produce initial swinging of the plate from one position to the other, said plate being loaded by a snap spring mechanism which, after initial swinging of the plate from one position, biases the plate towards the other position.

By using the initial opening movement of the door to tension a spring which then completes the folding out of the step according to the invention, the continued movement of the door will be independent of the step. The force required for opening and closing the door will not be increased appreciably by adding a step according to the invention.

The invention will be described in more detail with reference to an example shown in the accompanying drawing, in which FIG. 1 is a frontal view of a folding step,
FIG. 2 is a view along the line II—II in FIG. 1, and
FIG. 3 is a view along the line III—III in FIG. 1.

In the figures, 1 designates a vehicle door which has beneath it a fixed step 2 mounted in a conventional manner. A pair of brackets 3 are fixed to the vehicle frame and extend down from the fixed step 2. A shaft 4 is rotatably mounted in the brackets 3, said shaft being rigidly joined to a plate 5 which forms a folding step. The plate 5 can be swung between an essentially vertical position and a horizontal position, as indicated in FIG. 2, and it is rigidly joined to a pair of limiting abutments 6 which, when the plate is in the horizontal position, abut against a beam 7 running between the brackets 3. In the vertical folded-up position, the plate 5 itself abuts against the beam 7.

From the door 1, a vertical shaft 8 extends downwards which is journalled in one of the brackets 3. The shaft 8 extends in the extension of the door hinge line and is welded to a hook-shaped flat steel member 9 which is screwed securely to the hinge half, joined to the door, of the lower door hinge 10. With this design, the shaft 8 will only be subjected to rotation when the door is being opened or closed. The shaft is provided with a laterally extending pin 11 which forms a driver and interacts with a pair of heels 12,13 on the plate 5 and on one abutment 6 respectively, for producing the initial swinging of the plate 5 when the shaft 8 is rotated.

The plate 5 is pivotally connected to one end of a curved bar 14, the other end of which is joined to a tension spring 15 which is hooked securely to the underside of the fixed step 2. The spring 15 and the bar 14 are arranged relative to the plate 5 so that they form a snap spring mechanism. As can be seen in FIG. 2, the line of action 16 of the spring 15 lies to the left of the plate shaft 4 in the folded-out position, shown with solid lines, so that the spring 15 subjects the plate to a clockwise torque. When the plate has begun to be folded upwards, the line of action of the spring is moved to the opposite side of the shaft 4, thereby subjecting the plate to a counter-clockwise torque which acts to fold up the plate.

When the door 1 is closed and the plate 5 is folded up to the position shown in FIG. 2 with dash-dot lines, the pin 11 lies between the heels 12,13 and close to the heel 12. This means that already during the initial opening movement of the door, the pin 11 will begin, via the heel 12, to fold out the plate 5. After a short distance, the line of action of the spring 14 passes the axis of rotation of the plate, whereafter the folding out to the horizontal position is accomplished with the aid of the spring, entirely independent of the continued opening movement of the door. The folding up is done in the corresponding manner but reversed, when the pin 11 drives the heel 13 as the door is closed. As can be seen in FIG. 2, the connection between the bar 14 and the plate is placed so that the line of action of the spring is moved farther from the axis of rotation of the plate when the step is folded up than when it is folded down; the torque exerted by the spring thus being greater in the folding-up direction than in the folding-down direction. This provides compensation for the folding-down torque provided by the force of gravity.

What I claim is:
1. In combination with a vehicle having a door, a plate mounted on the vehicle for vertical swinging movement about a horizontal axis between a position in which said plate extends from said axis essentially vertically upwardly and a position in which the plate extends from said axis horizontally outwardly, and means acting between the door and the plate upon opening and closing of the door, to swing the plate between said positions, said means including a shaft secured to the door and extending downwardly from the door in extension of the door hinge line, means on the plate interacting with the shaft such that upon rotation of the shaft, the plate is caused to swing vertically, and over-center spring means acting to bias the plate toward each of said two positions as the plate moves in opposite directions between said two positions.

2. Structure as claimed in claim 1, said over-center spring means comprising a tension spring which is secured to the vehicle at a point, said point and said axis defining a downwardly inclined plane, both of said positions being disposed on the same side of said plane.

3. Structure as claimed in claim 2, said spring being secured at its end opposite said point to a bar which is pivotally secured to the plate at a point spaced from said axis.

4. Structure as claimed in claim 3, said bar having an outwardly and upwardly curved lower end and being secured to said plate at a point lower than said axis.

5. Structure as claimed in claim 1, said shaft being welded to a hook-shaped flat steel member which is screwed securely to a hinge half joined to the door and which curves beneath the lower edge of the door.

* * * * *